United States Patent [19]

Sato et al.

[11] 4,215,378
[45] Jul. 29, 1980

[54] AUTOMATIC STOP DEVICE FOR A TAPE RECORDER

[75] Inventors: Masanobu Sato; Kenzi Furuta, both of Hachioji, Japan

[73] Assignee: Olympus Optical Co., Ltd., Tokyo, Japan

[21] Appl. No.: 958,620

[22] Filed: Nov. 8, 1978

[30] Foreign Application Priority Data

Nov. 25, 1977 [JP] Japan .................. 52-141320

[51] Int. Cl.$^2$ .......................................... G11B 15/48
[52] U.S. Cl. ..................... 360/74.1; 360/74.2
[58] Field of Search ............. 360/74.1, 74.2, 137; 242/186, 189–191

[56] References Cited

U.S. PATENT DOCUMENTS

| 3,811,640 | 5/1974 | Nagahird et al. | 242/191 |
| 4,044,233 | 8/1977 | Sato | 242/191 X |
| 4,135,216 | 1/1979 | Laufer | 360/74.1 |

FOREIGN PATENT DOCUMENTS 52-63315  5/1977  Japan .

Primary Examiner—John H. Wolff

[57] ABSTRACT

An automatic tape recorder-stopping device is described wherein a up-down counter carries out up- or down-counting in accordance with a number of pulse signals issued at a frequency proportional to a number of rotations of a tape reel. The up-down counter generates an output signal when its contents are reduced to zero. The motor circuit for the tape recorder mechanism is opened in response to an output signal from the up-down counter. In this point in time, the counter is held at zero without further counting the pulse signals.

6 Claims, 2 Drawing Figures

AUTOMATIC STOP DEVICE FOR A TAPE RECORDER

BACKGROUND OF THE INVENTION

This invention relates to an automatic stop device for a tape recorder and more particularly to an automatic tape-recorder stopping device operated by logic control.

An automatic tape-recorder stopping device operated by logic control is provided with an electronic counter which, at the time of recording, carries out addition in synchronization with pulses issued at a frequency proportional to the number of rotations of, for example, a take up reel, and, at the time of rewinding, performs subtraction in synchronization with pulses sent forth at a frequency proportional to the number of rotations of the take up reel. When the contents of the electronic counter are brought to zero, an output pulse signal is produced from the counter. A motor circuit is opened in response to the output pulse signal, automatically stopping the tape recorder. With such type of automatic tape recorder-stopping device, an electronic counter of, for example, the 3-digit type is generally used. Now let it be assumed that recording is started with a number of zero at which the electronic counter is preset; when the counter counts, for example, 185, recording is brought to an end; and the magnetic tape is rewound to a point at which recording was first started. At this time, the counter subtracts the number proportional to a number of backward rotations of the take up reel from the count contents i.e. 185. When subtraction proceeds to zero, the counter generates an output pulse to open the motor circuit, thereby stopping the drive of a motor. At this time, however, the take up reel makes a few excessive rotations due to the inertia of a flywheel. As the result, the contents of the counter are further subtracted to, for example, 998. Where, under this condition, the tape recorder is operated for reproductive, the take up reel makes a normal rotation, carrying out addition as 998→999→000. When addition is carried to a specified number of 000, the motor is generally designed to be brought to rest. To prevent such undesirable stop of the motor when the operation of the tape recorder is made ready for reproduction after completion of rewinding, is may be contemplated to provide a braking device for forcefully braking the flywheel in response to an output signal from the counter at the time of rewinding or provide a seperate switch to control a motor-stopping circuit. When, with the latter method, the switch is depressed, the motor stopping circuit is operated to stop the motor in response to an output signal from the counter. After the stop of the motor, the motor-stopping circuit is reset, preventing the motor-stopping circuit from being set, unless the switch is depressed again. However, the above-mentioned process involves the complicated arrangement of a tape recorder and an electric circuit, obstructs the miniaturization of the tape recorder and unavoidably increases its cost.

SUMMARY OF THE INVENTION

It is accordingly the object of this invention to provide a logic-controlled automatic tape-recorder-stopping device which can stop the operation of an electronic counter, the moment a motor is brought to rest.

DETAILED DESERIPTION OF THE INVENTION

Figure 1:
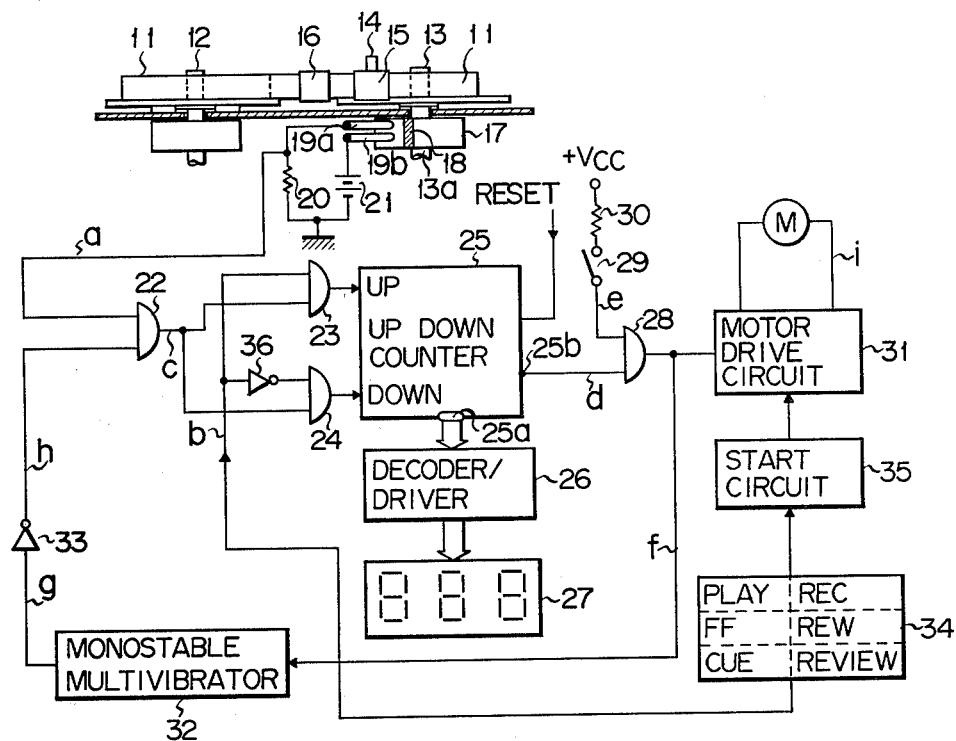
FIG. 1 is a circuit diagram of an automatic tape recorder-stopping device embodying this invention.

Referring to FIG. 1, a magnetic tape 11 is mounted an a tape feed reel 12 and tape take up reel 13. The magnetic tape 11 is also clamped, between a capatan 14 and pinch roller 15, while recording or reproduction is carried on through a magnetic head 16. A rotor 17 is coupled to a shaft 13a of the take up reel 13. A metal strip 18 is fitted to part of the peripheral wall of the rotor 17. The peripheral wall of the rotor 17 is further contacted by two conductive sliders 19a, 19b. These sliders 19a, 19b are grounded through a resistor 20 and cell 21. The junction of the sliders 19a, 19b and resistor 20 is connected to the first input terminal of an AND gate 22, where output terminal is connected to the input terminals of two AND gates 23, 24. The output terminals of these AND gates 23, 24 are respectively connected to the up terminal and down terminal of, for example, a 3-digit type up-down counter 25. The first output terminal of the up-down counter 25 is connected to a display device 27 for indicating the contents of the up-down counter 25 through a decoder-driver 26. The second output terminal of the 3-digit up-down counter 25 issues an output signal when the respective digit positions of the up-down counter 25 indicate a prescribed number, for example, zero. The second output terminal is connected to the first input terminal of an AND gate 28. The second input terminal of the AND gate 28 is connected to a power source impressed with a positive potential of $+V_{CC}$ through a series circuit of an automatic stop switch 29 and resistor 30.

Figure 2:
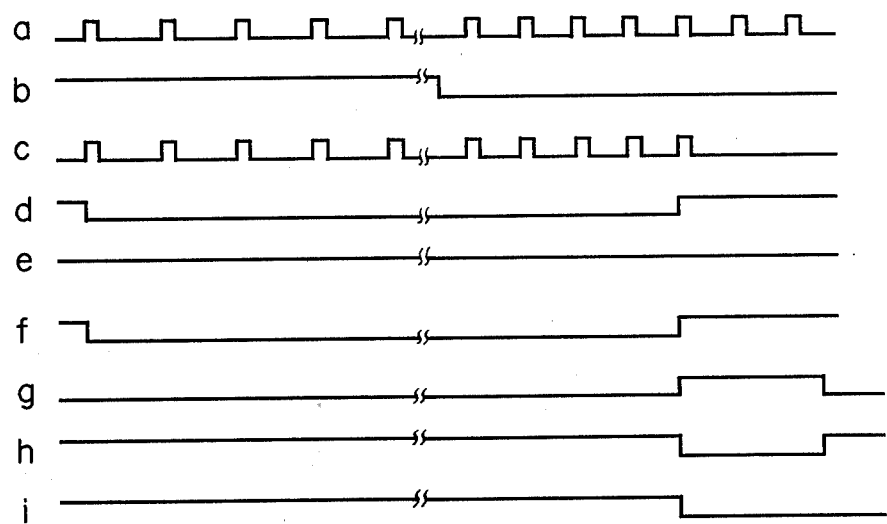
FIG. 2 is a time chart of signals produced at several points on the circuit of FIG. 1.

The output terminal of the AND gate 28 is connected to a motor drive circuit 31 and also to the input terminal of the AND gate 22 through a series circuit of a monostable maltivibrator 32 and inverter 33. Connected to the motor drive circuit 31 is a start circuit 35 which is operated interlockingly with a play button, recording button, fast feed button, cue button, rewinding button and review button included in a tape recorder-operating unit 34. The tape recorder-operating unit 34 issues an output signal denoting the forward or backward travel of a tape in response to the depression of an operation button. The output signal is supplied directly to the AND gate 23 and through an inverter 36 to the AND gate 24.

Where recording is to be started with a tape recorder arranged as described above, a rest signal is first supplied to the 3-digit up-down counter 25 by operating a reset button (not shown) to preset the respective digit positions of the 3-digit up-down counter 25 at zero. At this time, the second output terminal of the up-down counter 25 sends forth a signal of high voltage level, which is conducted to the AND gate 28. The second input terminal of the AND gate 28 is not supplied with any signal, because the automatic stop switch 29 is left open. Therefore, an output signal from the AND gate 28 has a low voltage level L. When, under this condition, the recording button is depressed, the start circuit 35 is started to actuate the motor drive circuit 31, thereby driving a motor M. The take up reel 13 is rotated with the rotor 17 by the drive of the motor M. The sliders 19a, 19b are shortcircuited by the metal strip 18 for each rotation of the rotor 17. A pulse signal a (FIG. 2) is sent forth to the first input terminal of the AND gate 22. Since an output signal from the AND gate 28 has a low voltage level L, the second input terminal of the AND gate 22 is already supplied with a signal of high voltage level H. As the AND gate 22 is left open, the pulse signal a is conducted to the first input terminals of both AND gates 23, 24. Since, at this time, the second input terminal of the AND gate 23 is already supplied with a pulse signal b of high voltage level H (FIG. 2) from the tape recorder-operating unit 34, the AND gate 23 is left open, allowing the pulse signal a to be supplied to the up terminal of the up-down counter 25. Since the pulse signal a is generated at a frequency proportional to a number of rotations of the tape take up reel 17. The up-down counter 25 counts a number proportional to the number of rotations of the tape take up reel 17. Thus, the number of rotations of the tape take up reel 17 is progressively added by the up-down counter 25.

Now let is be assumed that recording is brought to an end when the contents of the up-down counter 25 indicate a number of, for example, 178, and rewinding is started by depression of the rewinding or review botton for reproduction of the recorded signal. When the rewinding button is depressed, the tape recorder-operating unit 34 issues a signal b of low voltage-level L which closes the AND gate 23. The AND gate 24 is opened when supplied with a signal of high voltage level H inverted from the low voltage signal b by the inverter 36. At this time, the tape take up reel 13 is turned backward together with the rotor 17.

During the backward rotation, a number of pulse signals a proportional to the backward rotation of the rotor 17 is delivered to the AND gate 22 and through the AND gate 24 to the down terminal of the up-down counter 25, which in turn carries out subtraction from the counted number of 178 by a number equal to the number of pulse signals a received. At the time of rewinding, the automatic stop switch 29 is closed. When the contents of the respective digit positions of the 3-digit up-down counter 25 are reduced to, for example, zero as the result of subtraction, then the second output terminal 25 b of the up-down counter 25 produces an output pulse signal d of high voltage level H, which is supplied to the first input terminal of the AND gate 28. Since the second input terminal of the AND gate 28 is energized to a high voltage level through the automatic stop switch 29, the AND gate 28 generates a signal of high voltage level H in response to a signal delivered from the second output terminal 25 b of the up-down counter 25.

An output signal from the AND gate 28 actuates the motor drive circuit 31 to open the motor circuit, thereby stopping the motor M. At this time, the monostable multivibrator 32 is operated by an output signal f from the AND gate 28, producing an output signal g of high voltage level H. Accordingly, a signal h of low voltage level L is conducted to the second input terminal of the AND gate 22 through the inverter 33, closing the AND gate 22. Cosequently, the pulse signal a ceases to be supplied through the AND gate 22, the closure of the AND gate 22 prevents a pulse signal from being sent forth at a frequency preportional to a number of rotations of the tape take up reel 13 or rotor 17 which still continues to be rotated even after the stop of the motor M due to the inertia of the flywheel. As the result, the pulse signal ceases to be supplied to the up-down counter 25, whose contents are held intact. Where, under this condition, the reproduction or play button is depressed, then the start circuit 35 and consequently the motor drive circuit 31 are put into operation, to drive the motor M. The tape take up reel 13 is rotated with the rotor 17. The magnetic tape 11 is taken up while being clamped between the capstan 14 and pinch roller 15 and is reproduced through the magnetic head 16. At this time, a number of pulse signals proportional to a number of rotations of the rotor 17 are supplied to the first input terminal of the AND gate 22, as in the case of recording the second input terminal of the AND gate 22 is supplied with a signal of high voltage level H inverted by the inverter 33 from a signal of low voltage level L produced by the monostable multivibrator 32 whose output signal is designed to be inverted in voltage level after a prescribed length of time. Therefore, the pulse signals a are delivered to the up terminal of the up-down counter 25 through the AND gate 22 now opened and also through the AND gate 33. Since, at this time, the contents of the respective digit positions of the 3-digit up-down counter 25 indicate, for example, zero, up-counting is started with the number of zero. Where, therefore, counting is started again at the time of reproduction, reproduction can be continued without the stoppage of the motor M.

As mentioned above, this invention has the advantages that the up-down counter 25 does not carry out counting in response to excessive pulse signals issued by the inertia of the rotating section of a tape recorder, particularly the flywheel, thereby suppressing the erroneous behavior of a tape recorder; and the tape recorder-stopping device is formed of a simple logic circuit, preventing the arrangement of a tape recorder from being complicated and allowing for its miniaturization.

Where, with the foregoing embodiment, recording or reproduction is commenced by starting counting from zero indicated by the respective digit-positions of the 3-digit up-down counter 25 with the automatic stop switch 29 closed, and if, during that time, the AND gate 28 should happen to produce an output signal of high voltage level H which stops the motor M, the motor drive circuit 31 positively drives the motor M in response to the output signal generated from the start circuit 35 which is operated by the operation button of the tape recorder-operating unit 34.

With the above-mentioned embodiment, the up-down counter 25 was designed to issue a motor-stopping signal only when the contents of the counter were reduced to zero. However, the counter 25 may be arranged to send forth a motor-stopping signal when its contents indicate any other number. Further, it is possible to preset the up-down counter 25 to a given number, thereby stopping a magnetic tape at a desired point.

What we claim is:

1. An automatic tape recorder-stopping device which comprises a motor for driving a tape reel, a motor drive circuit for driving the motor, first signal-generating means for issuing a pulse signal at a frequency proportional to the rotation number of a tape reel, second signal-producing means for detecting the normal and backward rotations of the tape reel and issuing the normal and backward rotation signals, a counter circuit which counts up and down in response to one of said normal and backward rotation signals from said second signal-producing means which denotes the normal and backward rotations of the tape reel, carries out addition or subtraction in synchronization with the pulse signal from the first signal-generating means, and sends forth an output signal in accordance with the counted contents, means for deenergizing the motor drive circuit in response to the output signal from the counter circuit, and holding means connected to the counter circuit for sustaining the contents of the counter circuit in response to the output signal therefrom.

2. The automatic tape recorder-stopping device according to claim 1, wherein the first signal-generating means comprises a rotor coupled to the tape reel; at least one conductor strip on the peripheral wall of the rotor to rotate therewith; and a pulse-issuing circuit for detecting the arrival of said conductor strip and produing pulse signals at a frequency proportional to the number of rotations of the rotor.

3. The automatic tape recorder-stopping device according to claim 1, which further includes a display unit connected to the output terminal of the counter circuit to indicate its contents.

4. The automatic tape recorder-stopping device according to claim 1, 2 or 3 wherein the second signalproducing means includes an operation circuit which is received in a tape recorder, is operated interlockingly with the selected one of a plurality of operation button corresponding to a plurality of operation modes of the tape recorder, and issues a signal denoting the rotation directions of the tape reel corresponding to the selected operation mode.

5. The automatic tape recorder-stopping device according to claim 4, wherein the plural operation modes include the play mode, fast feed mode, cue mode and recording mode which are carried out when a tape reel makes a normal rotation and the rewind mode and review mode which are effected when the tape reel makes a backward rotation.

6. The automatic tape recorder-stopping device according to claim 1, 2 or 3, wherein the holding means comprises a monostable multivibrator which is operated in response to an output signal from the counter circuit; and a gate circuit which suspends the supply of a pulse signal from the first-signal generating means to the counter circuit in response to a pulse signal having a prescribed width which is issued from the monostable multivibrator only during period corresponding to said pulse width.

* * * * *